J. MURO.
WOODEN STAVE PIPE BANDING MACHINE.
APPLICATION FILED JAN. 8, 1919.

1,326,136.

Patented Dec. 23, 1919.

Inventor
Juichiro Muro
By M.C. Massie
his Attorney

UNITED STATES PATENT OFFICE.

JUICHIRO MURO, OF NISHINARI-GUN, OSAKA-FU, JAPAN, ASSIGNOR TO TOYO SUIDO MOKKAN KWAISHA, LTD., OF SAGISU-CHO, NISHINARI-GUN, OSAKA-FU, JAPAN, A CORPORATION OF JAPAN.

WOODEN-STAVE-PIPE-BANDING MACHINE.

1,326,136. Specification of Letters Patent. Patented Dec. 23, 1919.

Application filed January 8, 1919. Serial No. 270,182.

*To all whom it may concern:*

Be it known that I, JUICHIRO MURO, engineer, citizen of Japan, residing at No. 176 Kozima-omachi, Nishinari-Gun, Osaka-Fu, Japan, have invented certain new and useful Improvements in Wooden-Stave-Pipe-Banding Machines; and I do hereby declare the following to be a full, clear, and exact description of the invention, such as will enable others skilled in the art to which it appertains to make and use the same.

This invention relates to a machine to hoop wooden pipes, that is to say, pipes made by cooperage. To hoop such pipes it has been customary to use sets of metal bands or hoops having two or more segments and corresponding jointing bolts. But this method is always defective in that leakage is certain to occur at parts farthest from a segment jointing bolt. This is because however firmly these bolts are screwed down in order to tighten the adjacent segments and to reduce the diameter of a hoop, the friction between the staves and the segments of the hoop prevents the latter from coming into the closest contact. In consequence those staves located farthest from a bolt can never be perfectly compacted, though those nearest to it are more tightly held together.

The object of my invention is to provide a device for binding staves firmly and with uniform strength, prior to their being hooped together with metal segments or winding wire.

Figure 1:
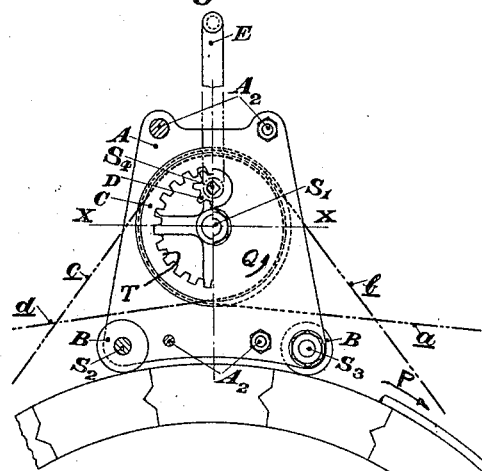
Figure 2:
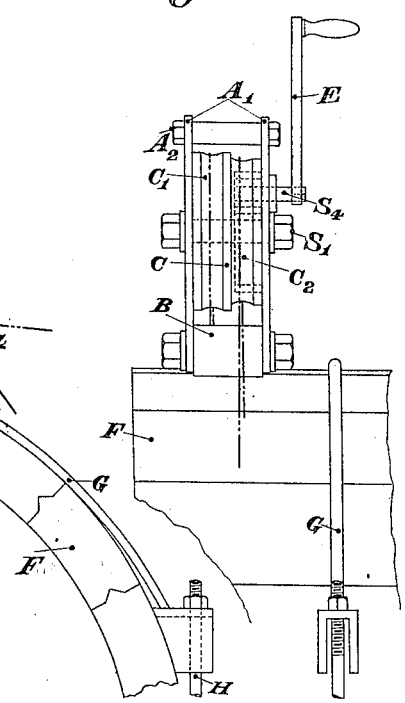
Figure 3:
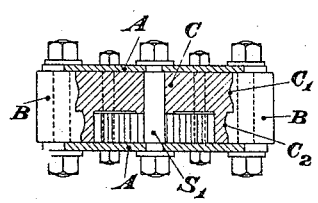

In the accompanying drawing is shown a substantial embodiment of my invention. Figure 1 is a front elevation of the machine fitted on a large wooden pipe, with part of the case cut off. Fig. 2 is a side elevation of same. Fig. 3 is its plan, being a section on the line X—X of Fig. 1.

In the same drawing A is a metal case, consisting of two side plates $A_1$ and jointing bolts $A_2$. Three axes $S_1$, $S_2$, and $S_3$, and a shaft $S_4$ are provided on this case, a two-stepped sprocket wheel C and two rollers B being fitted on the said three axes respectively; while a pinion D, which gears to an internal gear T cut inside the sprocket wheel C is fixed on the shaft. The metal case A and the rollers B supporting it upon the pipe together constitute the carriage of the machine, which carriage is propelled circumferentially of the pipe during the operation of the machine. E is a crank handle attached to the shaft. A suitable flexible means is fitted around the pipe and may consist of an endless chain, or rather, a long chain $a$—$b$—$c$—$d$ so arranged that the part $a$ by continually going over the step of the larger diameter $C_1$ of the sprocket wheel C comes back as $b$, while the part $c$ traveling over the step $C_2$ of the smaller diameter of the same wheel C returns as $d$, as an endless chain is placed on a differential chain block.

The operation of the machine of my invention is as follows:—Part of a wooden stave pipe temporarily bound together with a set of metal hoops G and their jointing bolts H is indicated in the drawing by the letter F. The endless chain is so arranged that a portion of it denoted by letter $b$—$c$ goes around the pipe in the manner shown in Fig. 1, while the case A is fitted on the outside of the pipe by means of rollers B.

When these preliminary steps are taken, that part of the chain marked $a$ is to be pulled tightly. The friction between the chain and the staves will keep the former from slipping away and will cause the machine itself to move in the direction of the arrow P, the sprocket wheel C turning in the direction of the arrow Q. In consequence of this, while $c$ portion of the chain is slackened, its $b$ portion is tightened, so that the $b$—$c$ portion which goes around the pipe shortens itself, that is to say, it reduces its length to the extent of the difference of the relative peripheral lengths of the two steps $C_1$ and $C_2$, every time C completes its round. Instead of gradually pulling on the $a$ portion of the chain, it is advisable to move the machine by turning the handle E and by so doing it can not only be moved in any direction, but a stronger tension can be given to the chain. The more $c$—$b$ portion is shortened the more staves are tightened. The movement of the machine along the circumference of a pipe will gradually and uniformly intensify the grip all around. When the machine gets immovable, as the staves are sufficiently tightened, metal hoops are put on, or steel wire is wound over, the pipe at close proximity to the chain, which is then taken off the pipe either by pulling it at its opposite end or by turning the handle in an opposite direction, and the hooping of a perfect order is accomplished.

What I claim is:—

1. A machine to hoop wooden stave pipes, comprised of a case, a two-stepped sprocket wheel mounted in said case, a chain which is so placed on the said two-stepped sprocket wheel that one of its ends turns around over the step of larger diameter while the other turns around over that of the smaller one, and two rollers mounted on the said case, the device to be fitted on the outside of the aforesaid pipe by means of the said two rollers.

2. A machine to hoop wooden stave pipes, comprised of a case, a two-stepped sprocket wheel having an inner gear cut inside its rim, and mounted in the said case, a pinion which is to be manually turned by a crank handle, geared to the said internal gear, and mounted in the said case, a chain which is so placed on the said two-stepped sprocket wheel that one of its ends turns around over the step of larger diameter while the other turns around over that of the smaller one, two rollers mounted in the said case, and the device is to be fitted on the outside of a wooden stave pipe by means of the said two rollers.

3. In a machine for compacting the staves of wooden stave pipes in applying hoops thereto, in combination a two-stepped wheel, and flexible means so arranged on said two-stepped wheel that one of its ends passes over the step of larger diameter while the other end passes over the step of smaller diameter.

4. In a machine for compacting the staves of wooden stave pipes in applying hoops thereto, in combination, flexible means adapted to be fitted around the pipe, and means for tightening said flexible means comprising devices adapted and arranged to have unequal lengths of said flexible means bearing thereon.

5. In a machine for compacting the staves of wooden stave pipes in applying hoops thereto, in combination a carriage, flexible means adapted to be fitted around the pipe, and means on said carriage for tightening said flexible means and for propelling said carriage circumferentially of the pipe.

6. In a machine for compacting the staves of wooden stave pipes in applying hoops thereto, in combination a carriage, flexible means adapted to be fitted around the pipe, a pair of rotatable members of unequal diameter mounted concentrically on said carriage and connected to portions of said flexible means, and means for rotating said members to tighten said flexible means and to propel said carriage circumferentially of the pipe.

Dated 29th day of November 1918.

In testimony whereof I hereunto affix my signature.

JUICHIRO MURO.